May 28, 1963
J. L. NEIL
3,091,227
AUTOMATIC VALVE CLEARANCE ELIMINATOR
Filed April 9, 1962
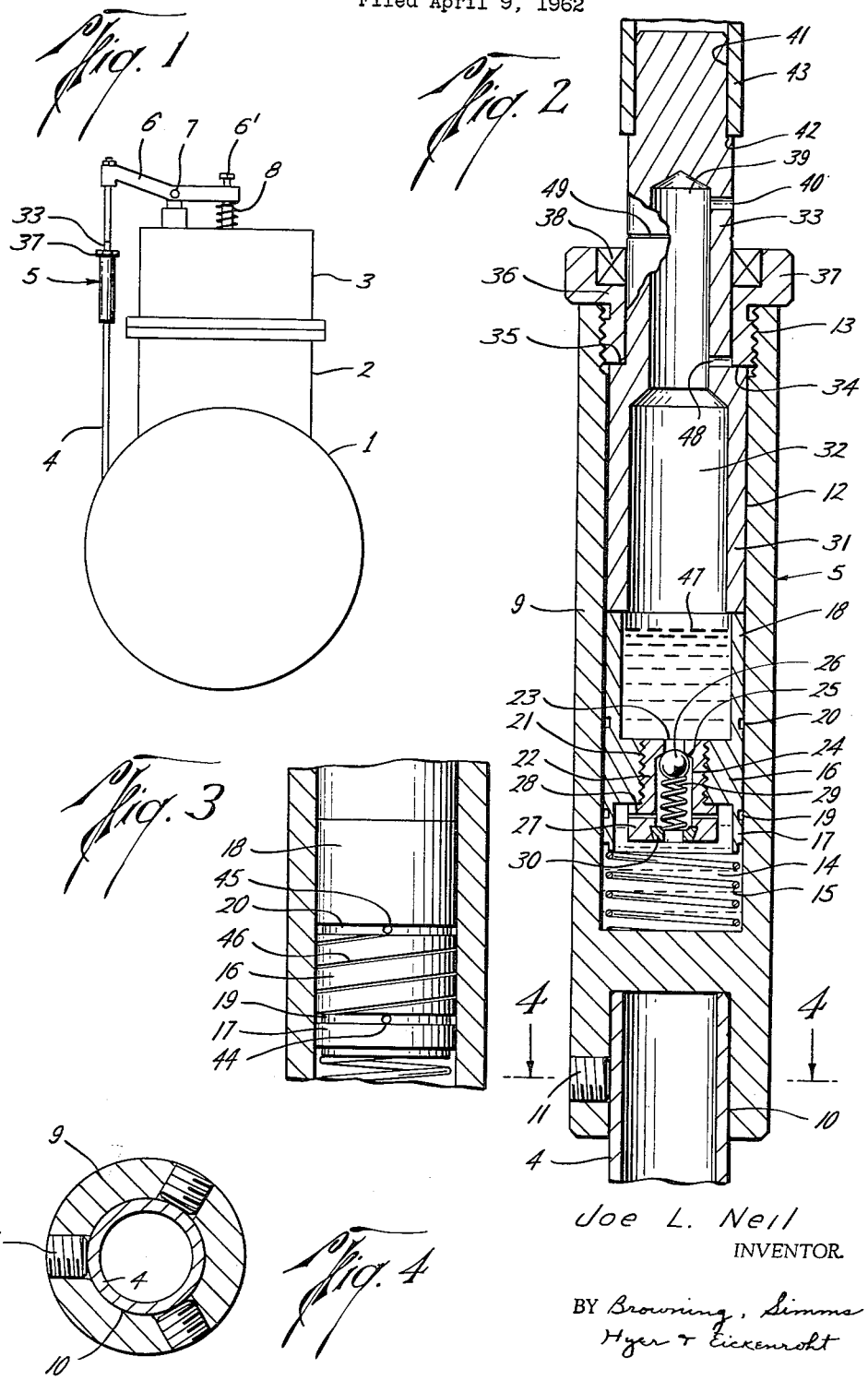
Joe L. Neil
INVENTOR.
BY Browning, Simms
Hyer & Eickenroht
ATTORNEYS United States Patent Office 3,091,227
Patented May 28, 1963

3,091,227
AUTOMATIC VALVE CLEARANCE ELIMINATOR
Joe L. Neil, Pampa, Tex., assignor to Panhandle Industrial Company, Pampa, Tex., a corporation of Delaware
Filed Apr. 9, 1962, Ser. No. 185,956
2 Claims. (Cl. 123—90)

This invention relates to an automatic valve clearance eliminator for engines and the like and has for its object the provision of such a device which will eliminate clearance in a valve actuating linkage and variations in such clearance due to variations in temperature, wear and other circumstances in the course of operation of the engine or the like.

Most engines of the character to which this invention relates employ a cam shaft or the equivalent having cams thereon which act upon pushrods as the engine goes through its cycle and longitudinal movement of such pushrods under pressure from such cams acts upon the valves to move the valves to open position. When the pressure of the cam on the pushrod is removed as the cycle of the engine progresses, the opening pressure on the valves is in turn released and means, usually a spring bias, are provided for moving the valves to closed position. At some point in the linkage there is customarily provided an adjustment whereby clearance in the linkage may be taken up so that as soon as the cam begins to bear upon the pushrod, movement of the pushrod will be translated into opening movement of the valve and the valve will be opened to the maximum degree in the course of the cycle.

During operation of the engine, the temperature of all the parts naturally increases which tends to elongate such elements as pushrods. It is, therefore, necessary, unless some automatic adjustment device is provided which changes the adjustment during operation of the engine, to initially adjust the valve opening linkage to allow substantial clearance when the engine is cold so that as it heats up, this clearance will be reduced and will be at a minimum during the normal operating temperatures of the engine. The result is that engines so adjusted are noisy in operation when cold and do not have the maximum valve opening, and when hot the adjustment is very critical if the valves are to have full opening travel and yet not be held open by excessive expansion of the valve operating linkage.

In order to cope with this problem, it has been proposed that a valve clearance eliminator be interposed between two sections of the pushrod with the same employing two telescoping parts, each being provided with a connector for connecting it with the adjacent ends of the two sections of the pushrod. Such an eliminator is provided with means for constantly urging it toward expanded position so as to take up automatically all clearance in the valve operating linkage and with means offering great resistance to anything more than extremely slow movement of the parts of the eliminator toward collapsed position so that when the pressure comes on the pushrod it will act to push the valves toward open position without appreciable reduction of its length. Reference herein to "extremely slow movement" means a movement so slow that during the maximum time interval of lifting of a pushrod by a cam in the operation of an internal combustion engine incorporating same, the movement would be less than the permissible pushrod clearance of such engine. Nevertheless the movement would be rapid enough to permit pushrod expansion as temperature increases during engine operation. With such an arrangement the pushrod would assume its maximum length due to expansion of the valve clearance eliminator at times when the cam is not bearing upon the pushrod, thus eliminating all clearance in the linkage. When pressure comes on the pushrod from the cam, the pushrod moves with the clearance eliminator as a unit to open the valve due to the means for resisting collapsing movement of the eliminator except at extremely low rates of speed. By this means the length of the pushrod is adjusted each time the valve closes so as to eliminate all clearance. This not only adjusts for variations in temperature of the engine during operation, but also for wear occurring during the life of the engine within the limits of the eliminator.

It will be clear, however, that although the over-all travel of the eliminator parts relative to each other will be great enough to take up all clearance variations expected, such maximum travel will occur only when the engine is stopped and allowed to cool and otherwise only over a long period of time as tappet, cam or pushrod wear occur. The actual movement of the eliminator parts relative to each other longitudinally of the eliminator on each stroke of the engine will be infinitesimal.

Previous attempts to provide satisfactory eliminators have employed a cylinder as one of the parts of the eliminator to be engaged with one portion of a pushrod in which the eliminator is to be incorporated, together with a very close fitting piston partly immersed in hydraulic fluid within the cylinder having a valved passageway from one side of the piston to the other. The object was to permit the piston to move relatively freely in one direction while preventing all except the very slowest movements in the opposite direction. Means has been provided for urging such a piston in a direction to take up clearance in a pushrod in which the device is incorporated. Engagement with the other section of the pushrod has been by means of a driver telescoped into the cylinder and engaging the end of the piston. The piston was made long relative to the length of the cylinder so as to take up a considerable portion of the cylinder length and allow the provision of a skirt on the piston above the main body of the piston to serve as a reservoir in that portion of the chamber above the piston for the hydraulic fluid. This arrangement prevents hydraulic fluid from being momentarily trapped between the driver and the piston when upon occasion the two might separate slightly, but it left the driver quite short in a direction axially of the cylinder. Under these circumstances it was found that while the eliminator might work fairly satisfactorily at first, there would shortly occur considerable wear around the periphery of the driver and within the cylinder at the position occupied by the driver during operation of the engine, allowing the overall pushrod in which the eliminator was employed to buckle or bend due to this lateral wear between the cylinder and driver. Such buckling or bending of the over-all pushrod prevented the driver from sliding freely in the cylinder and thus interfered with proper operation of the clearance eliminator to take up clearance.

Heretofore it has not been understood just how such wear occurred between the driver and the cylinder wall because the two were very fairly tightly fitted and the lengthwise travel of the driver within the cylinder on each cycle of operation of the pushrod was so extremely small that it was thought negligible. Nor was it understood why the wear occurred between the driver and cylinder rather than between piston and cylinder, since both moved the same amount. The possibility of lateral vibration of the driver in the cylinder seemed remote because of the extremely snug fit of the driver in the cylinder. Since this fit was already as snug as permissible while still allowing free longitudinal movement of the driver in the cylinder, the expedient of increasing the snugness of this fit was not practical.

It is an object of this invention to provide an automatic valve clearance eliminator which will not suffer the rapid wear heretofore experienced in the engagement of the eliminator parts with each other.

Other objects and advantages of this invention will become apparent from the following description taken in connection with the accompanying drawings, which set out by way of illustration and example, one embodiment of the invention.

In the drawings:

FIG. 1 is an outline view of the crankcase, cylinder head and cylinder of an internal combustion engine showing the external portions of the valve actuating mechanism including the pushrod and illustrating the automatic valve clearance eliminator of the present invention interposed in such pushrod;

FIG. 2 is a longitudinal cross-sectional view through a valve clearance eliminator constructed in accordance with this invention on a much larger scale than that of FIG. 1 and illustrating the manner in which the clearance eliminator is secured between two ends of a pushrod in which the eliminator is interposed;

FIG. 3 is a fragmentary cross-sectional view through a midportion of the cylinder of the eliminator shown in FIG. 2, but showing the piston within such cylinder in elevation rather than in cross section as in FIG. 2; and FIG. 4 is a transverse cross section taken along the line 4—4 of FIG. 2.

It has been discovered that by increasing the length of the bearing portions of the driver within the cylinder so that instead of having a very short portion closely fitting within the cylinder as has heretofore been felt desirable in order to promote free movement of the driver, the portion of the driver within the cylinder will provide upper and lower bearing parts against the cylinder walls which are spaced along the cylinder by a dimension at least as great as the transverse distance between such bearing parts that act to prevent misalignment of the driver and cylinder in any given direction. In other words, if one imagines a force tending to misalign the driver and cylinder in any one given lateral direction, such misalignment would be opposed by two bearing areas, one adjacent the extreme end of the driver within the cylinder on one side of the driver and the other adjacent the emergence of the driver from the cylinder on the other side of the driver. The longitudinal distance between these bearing parts, it has been found, will accomplish the objects of this invention if they are spaced longitudinally of the driver from each other by at least as great a distance as their transverse spacing from each other.

Referring now more in detail to the drawings, there is illustrated in FIG. 1 in diagrammatic form an end view of the crankcase 1 of an engine having a cylinder 2 extending upwardly therefrom with a cylinder head 3 on top thereof. Extending upwardly from the crankcase in which a cam shaft is usually located and roughly parallel to the cylinder 2 is a pushrod 4 having an automatic valve clearance eliminator 5 interposed therein intermediate the ends of the rod 4. The upper end of this rod bears in usual fashion against a rocker arm 6 pivoted at 7 on a mount on the cylinder head and bearing at its opposite end against a valve stem 8.

It will be understood that the engine illustrated is of the character commonly referred to as an overhead valve engine and that the pushrod 4 bearing against one end of the rocker arm 6 operates to move the valve stem 8 to open a valve between a manifold opening into the cylinder head and the interior of the cylinder which at its upper end provides a firing chamber. When the cam shaft rotates so as to release pressure on the pushrod 4 suitable means are customarily provided for causing the valve carried on the stem 8 to move to closed position. Ordinarily this is a valve biasing spring 8' known as a valve spring. The adjustment of the valve operating linkage just described is normally by means of a set screw 6' on one end of the rocker arm 6 and it will be seen that this set screw can be tightened so as to take up all slack or clearance in the valve actuating linkage. It is further noted, however, that if this adjustment becomes too tight there will be a constant pressure on the valve stem 8 even when the cam is not pressing against the pushrod 4, and the valve will be held open at all times, thus preventing the engine from operating properly. On the other hand, if this adjustment of the set screw 6' is too loose, there will be considerable clearance in the valve actuating linkage and the valve stem 8 will not be depressed as far as it should be on opening of the valve, again interfering with proper operation of the engine.

The valve clearance eliminator illustrated more in detail in FIGS. 2, 3 and 4 is shown to consist of a body comprising a cylinder 9 having a socket 10 in its lower end adapted to receive and be secured to the upper end of the lower section of pushrod 4 by means of set screws 11. This is clearly illustrated in the lower end of FIG. 2 and in FIG. 4. The major portion of the cylinder body 9 is taken up by the cylindrical bore 12 which extends downwardly from the upper end of the cylinder body and terminates at its upper end in a short threaded portion 13 for a purpose presently to be described.

In the lower end of the cylindrical opening 12 there is provided a reservoir 14 in which is disposed a spring 15 bearing against the bottom of this cylindrical bore at one end and at its other end bearing against the lower end of a piston 16. The lower end of this piston 16 has a short skirt 17 which actually receives the upper end of the spring 15, and on the upper end of the piston there is a shell or skirt extension 18. Surrounding the skirts intermediate their ends are oil grooves 19 and 20, each connected with the interior of the skirt on which it is cut. Through the midportion of the body 16 of the piston is a threaded opening 21 to receive a threaded valve body 22 having a passageway 23 therethrough interconnecting the upper and lower ends of the piston. The upper end of this passageway 23 is of smaller diameter than the lower end 24 and at the juncture of the two is a valve seat 25 adapted to receive a check valve in the form of a ball 26. Obviously this ball 26 will prevent upward flow through the passageway 23 but permit substantially free flow downwardly therethrough.

The valve body 22 has a head 27 on its lower end adapted to be threaded up tightly against the lower end surface of the piston body 16 so as to rigidly mount the check valve body 22 in the piston 16. Radial passageways are preferably provided out through the head from the bore 24 to the exterior of the head as shown at 28 so as to prevent any restriction of flow downwardly through the openings 23 and 24 of the piston. The check valve 26 is spring pressed upwardly against its seat by means of a spring 29 disposed in the opening 24 below the ball and bearing at its lower end against a suitable plug 30 permanently mounted in any suitable fashion in the lower end of the passageway 24.

It will be readily apparent that with the piston fitted very snugly within the cylinder and the space below the piston and within the skirt 18 above the piston nearly filled with a hydraulic fluid of suitable consistency, the piston may move upward freely under the influence of the spring 15, but may not be moved downwardly except extremely slowly as the hydraulic fluid is permitted to leak past the outside of the piston between it and the cylinder wall. Inasmuch as the space between the piston and the cylinder wall must be a finite space no matter how small, there will be some leakage and the piston may move extremely slowly in a downward direction if forced to do so but it is a simple engineering problem for any given set of circumstances to so design the parts that this movement will represent only an extremely small portion of the permissible clearance in a valve actuating linkage during the very short time that force is being transmitted through a pushrod to open a valve and that after each such force transmission the spring can freely move the piston up again to take up all clearance. Such movement during the extremely small time that the force is being threaded through the rod is so small as to be practically undetectable and hence for all practical purposes no clearance exists at any time.

Positioned within the cylinder 12 above the piston 16 is a driver 31, likewise fitted very snugly within the cylinder. This driver is made hollow as shown at 32 and is provided with a stem of smaller diameter than the lower portion of the driver which stem extends upwardly past the upper end of the cylinder as shown at 33. Between the lower portion of the driver 31 and the upper stem 33 is a shoulder 34 upwardly facing and adapted to engage the lower end 35 of a cap threaded into the threads 13 in the upper end of the cylinder. This cap is threaded down tightly to engage the upper end of the cylinder as shown at 36 and the cap 37 may have a hexagonal outer contour or some other appropriate contour to receive a wrench for tightening it. Preferably it also has a seal 38 mounted therein to prevent hydraulic fluid from getting out of the cylinder accidentally and to prevent dust and dirt from entering. Preferably the fit between the stem 33 and the interior of the cap is such as to provide the same snugness or clearance as between the lower end of the driver 31 and the cylinder 12.

The hollow portion 32 within the driver is continued upwardly through the stem as shown at 39 and provided with a vent opening 40 so as to permit the air space within the driver to breathe as the driver is called upon to move slightly upwardly and downwardly. The upper end of the exterior of the stem is provided with suitable means for connecting it to the upper end portion of the pushrod, in this instance being shown as having a reduced end portion 41 with a shoulder 42 at its lower end adapted to receive the hollow pushrod section 43 with a press fit.

As previously mentioned, the grooves 19 and 20 outside the piston are connected to the interior of the piston by means of radial openings 44 and 45 with the result that there will be substantially no differential of pressure between the fluid in the chamber below the piston and the fluid in the groove 19, nor between the fluid in the chamber above the piston and fluid in the groove 20. This fixes the effective length of the piston as the distance between the grooves 19 and 20. In this portion of the exterior surface of the piston there is cut a spiral groove 46 which is of such cross section area as to permit a measured leakage and thus effectively and accurately control the rate at which the piston may be forced downwardly by controlling the rate at which fluid may flow upwardly around the outside of the piston along the groove 46.

Preferably the fluid within the space below the piston and extending into the skirt above the piston will be so controlled in volume that its upper level 47 will be below the upper end of the skirt 18 so that if momentarily the driver 31 should separate from the skirt 18 there will not be trapped between the driver and the piston any amount of hydraulic fluid that could possibly take up more than the desired amount of clearance from the valve actuating linkage and cause the valve to hold open.

Further, in order to provide for the driver 31 at all times to move freely upwardly and downwardly and not possibly trap fluid above it between the shoulder 34 and the cap shoulder 35, there is provided an opening 48 radially from the hollow interior of the driver to just above the shoulder 34.

In placing the clearance eliminator of the character described on an engine, the pushrod is first severed and a section taken out equivalent to the length which the eliminator is intended to occupy intermediate the ends of the pushrod. Then the lower end of the pushrod section will be placed in the socket 10 and secured therein by set screws 11 and the upper end placed over the small diameter portion 41 of the stem and pressed thereon with a press fit or otherwise secured thereto. Then the set screw 6' will be adjusted to move the clearance eliminator stem downwardly until the indicator mark 49 on the outside of the stem is just even with the top of the cap. This, of course, must be done very slowly so that the hydraulic fluid within the cylinder will have time to leak past the piston.

With the device so adjusted, the engine will be started and run until the parts come up to operating temperature, whereupon the adjustment will again be made to bring the scratch 49 flush with the top of the cap 37.

Now it will be seen that the engine will be operating normally without any clearance in the valve linkage from a practical standpoint and that when it cools the spring 15 will move the piston 16 and driver 31 upwardly to take up all clearance. Then when the engine is started cold there will be no clearance and as the parts expand with heat the driver will gradually be forced downwardly moving the piston 16 downwardly, the condition of no clearance prevailing throughout the warming up operation. The engine will thus run with great efficiency both while cold and after it gets warm and at all points in between. It will not be noisy in operation when cold.

As heretofore mentioned, previous attempts to provide an automatic valve clearance eliminator have employed a driver which it was thought should be made as short as possible below the lower end of the driver stem. In fact, drivers of the past have extended only to approximately the lower end of the smaller bore 39 illustrated in FIG. 2. This was thought desirable so that the least possible friction would be encountered between the driver and the cylinder and every effort was made to protect the piston against possible influence of any sidewise forces on the driver because it was understood that the piston would have to be free from such sidewise forces in order that it might move smoothly and truly within the cylinder and perform its metering function.

In accordance with the present invention, however, the larger diameter portion of the driver is made of far greater longitudinal extent as illustrated. It has been found desirable to make it as long as possible within reason and the one illustrated in the drawing is in excess of one and a half times the diameter of the larger diameter portion of the driver. However, it has been discovered that if this portion of the driver which slides within the cylinder be made long enough so that the distance from its lower end to that portion of the driver which slides within the cap is at least as great as the distance from the outermost diameter of the driver on one side to the outer surface of the stem on the other side, the results desired will be achieved. The driver will move smoothly and will not at any time tend to bind nor will it tend to dig into nor wear against the surface of the cylinder so that all in all it has been found that it performs much better at all times and has many times as great a life without wear as the old form. Furthermore, contrary to expectation, lengthening of the driver has not served in anywise to adversely affect the functioning of the piston.

The lengthening of the life and efficiency of the valve clearance eliminator by the expedient of this invention has been of such a character as to make the valve clearance eliminator a practical success.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An automatic valve clearance eliminator comprising a pair of relatively slidable telescoping parts having aligned pushrod receiving connections thereon respectively adapted for rigidly connecting them respectively with two aligned sections of a pushrod between which the eliminator is adapted to be interposed, such parts including cooperating guide and slide means and stop means limiting the relative telescoping movement of said parts and preventing them from disengaging each other, one of said parts including a cylinder, uni-directional motion-retarding means on said parts restricting them to extremely slow movement in a first direction to move said pushrod connections closer together while permitting them to move rapidly in the opposite direction relative to one another, and including a piston in said cylinder separate from said slide but positioned in force transmitting relation thereto to be urged thereby in said first direction, and means biasing said parts toward movement in said opposite direction relative to one another, said guide and slide means having thereon spaced pairs of cooperating bearing areas resisting misalignment of said parts in any one direction, said pairs having surfaces in engagement at any one time spaced longitudinally of the relative sliding movement of said parts and said pairs being spaced also in a direction normal to the direction of said relative sliding movement, the first-mentioned spacing being at least as great as the last-mentioned spacing.

2. An automatic valve clearance eliminator which comprises a cylindrical body having on one end adapted to be lowermost in use, a part adapted to be rigidly secured to the upper end of a lower pushrod section and an opening in said body extending downwardly from the upper end of the body and providing a hydraulic chamber, a piston movable longitudinally of said body in said chamber, means providing a passageway between said chamber above and below said piston, a check valve in said passageway for preventing all flow except seepage from below said piston to above the same while permitting free flow from above said piston to below the same to permit free upward movement of said piston while restricting downward movement thereof to extremely slow movement, spring means biasing said piston upwardly with respect to said cylinder, a driver above and separate from and in engagement with said piston and having a lower slide part in closely guided engagement within said chamber and an upper pin end adapted to be rigidly secured to the lower end of an upper pushrod section, and cooperating stop means on said driver and cylinder body limiting the upward movement of said driver relative to said body, said driver having its slide part in closely guided engagement with said body at points spaced apart longitudinally of the driver by not less than the maximum effective transverse dimension of the slide part across said points.

References Cited in the file of this patent
UNITED STATES PATENTS

| | | |
|---|---|---|
| 1,792,836 | Handwerker | Feb. 17, 1931 |
| 2,109,816 | Best | Mar. 1, 1938 |
| 2,438,631 | Bergmann | Mar. 30, 1948 |
| 2,516,172 | Baldwin | July 25, 1950 |
| 2,577,852 | Hufferd | Dec. 11, 1951 |
| 2,721,543 | Johnson | Oct. 25, 1955 |
| 2,927,566 | Moye | Mar. 8, 1960 |